United States Patent
Grove et al.

(10) Patent No.: US 12,540,209 B2
(45) Date of Patent: Feb. 3, 2026

(54) VINYL ACRYLIC EMULSION COPOLYMER AND USE THEREOF IN STAIN RESISTANT COATING COMPOSITIONS

(71) Applicant: Arkema Inc., King of Prussia, PA (US)

(72) Inventors: Jeremy L. Grove, Cary, NC (US); Michael Drewery, Monroe, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/795,938

(22) PCT Filed: Mar. 19, 2021

(86) PCT No.: PCT/US2021/023188
§ 371 (c)(1),
(2) Date: Jul. 28, 2022

(87) PCT Pub. No.: WO2021/188914
PCT Pub. Date: Sep. 23, 2021

(65) Prior Publication Data
US 2023/0357468 A1   Nov. 9, 2023

Related U.S. Application Data

(60) Provisional application No. 62/992,340, filed on Mar. 20, 2020.

(51) Int. Cl.
 *C08F 218/08* (2006.01)
 *C09D 131/04* (2006.01)
(52) U.S. Cl.
 CPC ......... *C08F 218/08* (2013.01); *C09D 131/04* (2013.01)

(58) Field of Classification Search
 CPC ............. C08F 218/08; C08F 220/1804; C08F 230/085
 See application file for complete search history.

(56) References Cited

U.S. PATENT DOCUMENTS

| | | | |
|---|---|---|---|
| 3,720,438 A | 3/1973 | Johnson et al. | |
| 3,814,716 A | 6/1974 | Kowalski et al. | |
| 4,434,259 A * | 2/1984 | Gold | D21H 19/34 106/169.34 |
| 5,576,384 A * | 11/1996 | N olken | C04B 41/4988 524/457 |
| 5,621,038 A * | 4/1997 | Chen | C08K 5/5415 524/837 |
| 5,670,077 A | 9/1997 | Carlson | |
| 5,686,523 A | 11/1997 | Chen et al. | |

(Continued)

*Primary Examiner* — Mark S Kaucher
(74) *Attorney, Agent, or Firm* — Debodhonyaa Sengupta

(57) ABSTRACT

Waterborne vinyl acetate-acrylic, "vinyl acrylic" emulsion copolymers which can be used in architectural coatings and impart stain resistance to such coatings are provided. The vinyl acrylic emulsion copolymer particles in the emulsion may contain one or more particle size modes, each with a respective narrow particle size distribution. The vinyl acrylic emulsion copolymers contain as a comonomer an ethylenically unsaturated monomer and also contain a hydrolyzable silane comonomer. The hydrolyzable silane may be present as a comonomer in the vinyl acrylic copolymer and/or may be added to the vinyl acrylic emulsion copolymer emulsion in the form of a hydrolyzable silane that may have a reactive group that is capable of reacting with the vinyl acrylic copolymer.

9 Claims, 7 Drawing Sheets

(56) References Cited

U.S. PATENT DOCUMENTS

| | | | | |
|---|---|---|---|---|
| 6,121,400 A | * | 9/2000 | Webster | C08F 16/04 |
| | | | | 526/348 |
| 2002/0069965 A1 | * | 6/2002 | Koehler | C09J 131/02 |
| | | | | 156/333 |
| 2004/0236013 A1 | * | 11/2004 | Lewis | C08F 246/00 |
| | | | | 524/832 |
| 2008/0271848 A1 | | 11/2008 | Killat et al. | |
| 2016/0186000 A1 | | 6/2016 | Yang et al. | |

* cited by examiner

VINYL ACRYLIC EMULSION COPOLYMER AND USE THEREOF IN STAIN RESISTANT COATING COMPOSITIONS

This application is a national stage application under 35 U.S.C. § 371 of PCT/US2021/023188 filed Mar. 19, 2021, which claims benefit to U.S. patent application Ser. No. 62/992,340, filed Mar. 20, 2020.

FIELD OF THE INVENTION

This disclosure relates generally to waterborne vinyl acetate-acrylic, "vinyl acrylic" emulsion copolymers which can be used in architectural coatings and impart stain resistance to such coatings. The vinyl acrylic emulsion copolymer particles in the emulsion may contain one or more particle size modes, each with a respective narrow particle size distribution. The vinyl acrylic emulsion copolymers contain as a comonomer an ethylenically unsaturated monomer and also contain a hydrolyzable silane comonomer. The hydrolyzable silane may be present as a comonomer in the vinyl acrylic copolymer and/or may be added to the vinyl acrylic emulsion copolymer emulsion in the form of a hydrolyzable silane that comprises a reactive group that is capable of reacting with the vinyl acrylic copolymer.

BACKGROUND OF THE INVENTION

Cleansability, sometimes used synonymously with the terms "stain resistance" or "washability", refers to the ability of a coating to resist staining or to be washed clean after being stained. Coatings that achieve good cleansability have utility in the areas of interior and exterior architectural/decorative coatings. Waterborne coating technologies that occupy this space are based on acrylic, vinyl acrylic (i.e., vinyl acetate-acrylic copolymers), and styrene-acrylic emulsion copolymers, for example. Coatings that display this performance attribute may be tested via a number of independent entities, to include but not limited to ASTM, Consumer Reports, and Master Painter's Institute (MPI).

Master Painter's Institute (MPI) is an independent third-party organization that sets performance standards for commercially available paints and coatings. Many institutional and high performance paint specifications are tied to MPI standards. Current cleansability tests evaluate the cleansability of a coating using hot coffee, graphite, and a 2 wt. % aqueous solution of nigrosine. Cleansability to nigrosine stain is considered more difficult to pass than the former hydrophilic stains. As such, meeting the cleansability specification according to the MPI cleansability tests is highly desirable and a significant challenge.

When used as the sole binder in an interior paint, many vinyl acrylic emulsion polymers do not meet the cleansability requirement for MPI specifications with the new cleansability requirements. However, the cost-effectiveness of vinyl acrylic emulsion polymers makes them attractive.

One approach to meeting the MPI specification related to cleansability and still achieve a cost target is by blending acrylic-based emulsions into the interior paints containing vinyl acrylic emulsions. This approach, however, negatively impacts other properties, as well as adds additional cost to the final coatings related to storage and processing time to blend the separate emulsions. Lastly, acrylic emulsions are not as cost-effective as vinyl acrylic emulsion polymers.

Accordingly, there is a need for a cost-effective vinyl acrylic emulsion polymer that is able to meet the stringent cleansability tests, while retaining cost-effectiveness and meeting other critical performance standards.

SUMMARY OF THE INVENTION

A first embodiment of an emulsion polymer composition comprising a population of sizes of polymeric particles is provided. The polymeric particles comprise copolymer comprising, in polymerized form, monomers a), b) and c). Monomer a) is present at between 40 weight percent and 95 weight percent, based on the overall weight of the polymeric particles, and comprises at least one monomer comprising vinyl acetate. Monomer b) is present at between 1.0 weight percent and 59.09 weight percent, based on the overall weight of the polymeric particles, and comprises at least one ethylenically unsaturated monomer. Monomer c) is present at between 0.01 weight percent and 4.0 weight percent, based on the overall weight of the polymeric particles, and comprises at least one monomer selected from free radical polymerizable hydrolyzable silanes. The at least one ethylenically unsaturated monomer b) is not selected from a) or c), and monomer a), monomer b), and monomer c) together total 100 weight percent. Further, the population of sizes of polymeric particles in the first embodiment comprises at least one mode. Each $mode_i$ comprises a respective weight average particle size $Dw_i$ as measured by disc centrifuge photosedimentometry and a respective number average particle size $Dn_i$ as measured by disc centrifuge photosedimentometry. For each $mode_i$, $Dw_i/Dn_i$ is 2.0 or less.

Also provided is a second embodiment emulsion polymer composition comprising a population of sizes of polymeric particles. The polymeric particles comprise copolymer which comprises, in polymerized form, monomer a) and monomer b). Monomer a) is present at between 40 weight percent and 95 weight percent, based on the overall weight of the polymeric particles. Monomer a) comprises at least one monomer comprising vinyl acetate. Monomer b) is present at between 5 weight percent and 60 weight percent, based on the overall weight of the polymeric particles. Monomer b) comprises at least one ethylenically unsaturated monomer. The at least one ethylenically unsaturated monomer b) is not selected from monomer a), and monomer a), and monomer b) together total 100 weight percent. Further, the population of sizes of polymeric particles in the second embodiment comprises at least one mode. Each $mode_i$ comprises a respective weight average particle size $Dw_i$ as measured by disc centrifuge photosedimentometry and a respective number average particle size $Dn_i$ as measured by disc centrifuge photosedimentometry. For each $mode_i$, $Dw_i/Dn_i$ is 2.0 or less. The second embodiment emulsion polymer composition further comprises between 0.1 and 5 weight percent, based on the total dry weight of the polymeric particles, of at least one hydrolyzable silane selected from trialkoxy silanes, tetraalkoxysilanes, and mixtures thereof.

In general, the process for preparing the emulsion polymers described herein are known to those who practice the art; however, many compositions and process variables contribute to the particle size distribution described above. For the purpose of description, one such process for forming an emulsion polymer composition comprising a population of sizes of polymeric particles is provided. The process comprises the following steps:

Step i): Combining, in a vessel, water, an anionic surfactant, a first monomer mixture, then a first portion of free radical initiator. The first monomer mixture comprises monomers a), b) and c). Monomer a) is present at between 40 weight percent and 95 weight percent, based on the overall weight of the first monomer mixture. Monomer a) comprises at least one monomer comprising vinyl acetate. Monomer b) is present at between 1.0 weight percent and 59.09 weight percent, based on the overall weight of the first monomer mixture. Monomer b) comprises at least one ethylenically unsaturated monomer. Monomer c) is present at between 0.01 weight percent and 4.0 weight percent, based on the overall weight of the first monomer mixture. Monomer c) comprises at least one monomer selected from free radical polymerizable hydrolyzable silanes. The at least one ethylenically unsaturated monomer b) is not selected from a) or c), wherein monomer a), monomer b), and monomer c) together total 100 weight percent.

Step ii): Polymerizing the first portion of the monomer mixture to form seed particles.

Step iii): Combining in the vessel with the seed particles a second portion of free radical initiator and a second monomer mixture. The second monomer mixture comprises monomers d), e) and f). Monomer d) is present at between 40 weight percent and 95 weight percent, based on the overall weight of the second monomer mixture. Monomer d) comprises at least one monomer comprising vinyl acetate. Monomer e) is present at between 1.0 weight percent and 59.09 weight percent, based on the overall weight of the second monomer mixture. Monomer e) comprises at least one ethylenically unsaturated monomer. Monomer f) is present at between 0.01 weight percent and 4.0 weight percent, based on the overall weight of the second monomer mixture. Monomer f) comprises at least one monomer selected from free radical polymerizable hydrolyzable silanes. The at least one ethylenically unsaturated monomer e) is not selected from d) or f), wherein monomer d), monomer e), and monomer f) together total 100 weight percent.

Step iv): Polymerizing on the seed particles the second monomer mixture to form the population of polymeric particles. The population of polymeric particles comprises at least one mode. Each mode$_i$ comprises a respective weight average particle size Dw$_i$ as measured by disc centrifuge photosedimentometry and a respective number average particle size Dn$_i$ as measured by disc centrifuge photosedimentometry. For each mode$_i$, Dw$_i$/Dn$_i$ is 2.0 or less.

Also provided are coatings comprising the first emulsion polymer composition disclosed herein, as well as coating comprising the second embodiment emulsion polymer composition disclosed herein. The coatings are capable of meeting the cleansability specification described in MPI standards #143-148 and MPI #138-141.

Further areas of applicability will become apparent from the description provided herein.

BRIEF DESCRIPTION OF THE DRAWINGS

The drawings described herein are for illustration purposes only.

DETAILED DESCRIPTION

Figure 1:
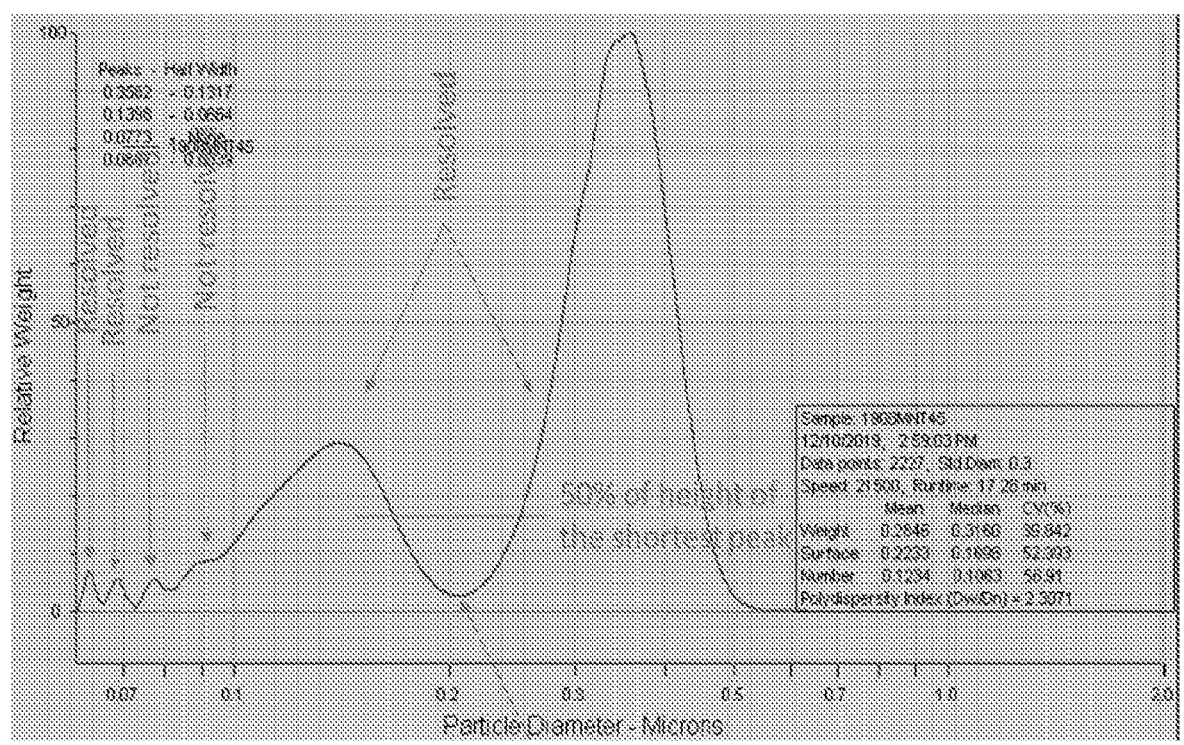
FIG. 1 illustrates a criteria for measuring particle size distribution.

The following description is merely exemplary in nature and is in no way intended to limit the present disclosure or its application or uses.

In the context of the present disclosure, "cleansability" refers to the ability of a coating to resist staining or to be washed clean after being stained.

Unless otherwise indicated, all percentages herein are weight percentages.

"Polymer" as used herein, is meant to include organic molecules with a weight average molecular weight higher than 20,000 g/mol, preferably higher than 50,000 g/mol, as measured by gel permeation chromatography.

"Hydrolyzable" silane as used herein, is meant to describe a molecule of the type containing silicon atoms bonded to one or more alkoxy functional groups that can hydrolyze to hydroxyl functional groups under a variety of aqueous conditions.

Generally, the inventors have discovered that vinyl acrylic emulsion polymers containing polymer particles that exhibit one or more particle size distributions as measured by Disc Centrifuge Photosedimentometer ("CPS Instruments"), each with a polydispersity index of less than 2.0, as expressed by the ratio of the weight average particle size (D$_w$) to the number average particle size (D$_n$), combined with a low level of a hydrolyzable silane functionality in the polymer and/or as a component of the emulsion, results in a surprising improvement in cleansability of a coating composition comprising the emulsion polymer. The combination of both the low level of hydrolyzable silane, whether included as a polymerized monomer in the emulsion polymer comprising the particles and/or as a functionalized hydrolyzable silane as a separate component of the emulsion, and a ratio of the weight average particle size to the number average particle size of 2.0 or less results in better cleansability in a coating made from these materials than either alone, i.e., the improvement in cleansability is not seen if both factors are not present. This surprising discovery permits the use of coating compositions comprising emulsions comprising vinyl acrylic emulsion polymers without the need to separately blend in another separate emulsion to achieve cleansability specifications.

In a first embodiment, the present disclosure generally provides an emulsion polymer composition comprising polymeric particles. The polymeric particles comprise, in polymerized form, three types of monomers. Monomer a) is at least one monomer comprising vinyl acetate. Monomer b) may be at least one ethylenically unsaturated monomer. Monomer c) may be selected from monomers containing hydrolyzable silane functional groups that are added during the emulsion polymerization. The at least one ethylenically unsaturated monomer b) is not selected from a) vinyl acetate or c) monomers containing hydrolyzable silane functional groups. Together, the three monomers total 100 weight percent on a dry basis.

In a second embodiment, the present disclosure generally provides an emulsion polymer composition comprising polymeric particles. The polymeric particles comprise, in polymerized form, two types of monomers. Monomer a) is at least one monomer comprising vinyl acetate. Monomer b) may be at least one ethylenically unsaturated monomer. The at least one ethylenically unsaturated monomer b) is not selected from a) vinyl acetate. Together, the two monomers a) and b) total 100 weight percent on a dry basis. In this second embodiment, in contrast to the first embodiment, the hydrolyzable silane functionality may be added to the emulsion polymer composition in the form of a non-ethylenically unsaturated hydrolyzable silane additive.

Throughout the following description, the difference between the two embodiments of the emulsion polymer composition is the hydrolyzable silane component of each embodiment as described. It should be understood that the two embodiments are used in the same way, and except for the silane component, all other discussion herein regarding coating compositions made from these embodiments as well as their cleansability apply to each. Accordingly, unless the "first embodiment emulsion polymer composition" or the "second embodiment emulsion polymer composition" is expressly referenced, the description applies to each of the first and the second emulsion polymer composition embodiments.

The polymeric particles in the emulsion polymer composition according to both embodiments have a weight average particle size and a number average particle size, both measured by disc centrifuge photosedimentometry. Importantly, the ratio of the weight average particle size to the number average particle size as measured by disc centrifuge photosedimentometry is 2.0 or less. This ratio of weight average particle size to number average particle size is also referred to as the size polydispersity index.

Monomer a): Vinyl Acetate

Vinyl acetate may be present (in polymerized form) in the polymer in the emulsion polymer composition at levels from 40 weight percent to 95 weight percent, based on the overall weight of the polymeric particles, on a dry basis, i.e. excluding water. The vinyl acetate may be present at levels from 40 wt. %-90 wt. %, or from 45 wt. % to 80 wt. %, or from 55 wt. %-90 wt. %, or 60 wt. %-85 wt. %, or 75 wt. %-80 wt. %, or 50 wt. %-80 wt. %, or 70 wt. %-95 wt. %, or 75 wt. %-85 wt. %, or 70 wt. %-90 wt. %.

Monomer b): Ethylenically Unsaturated Monomer

Non-limiting examples of suitable ethylenically unsaturated monomers that may be included (in polymerized form) in the polymer comprising the polymeric particles include alkyl acrylate monomers, alkyl methacrylate monomers, vinyl ester monomers, (meth)acrylamide monomers, and mixtures thereof. Non-limiting examples include such monomers as butyl acrylate, methyl acrylate and ethyl acrylate, methyl methacrylate, ethyl methacrylate, butyl methacrylate, cyclohexyl (meth)acrylate, allyl methacrylate, 2-ethylhexyl acrylate, styrene and/or its derivatives such as alpha-methyl styrene. Other methacrylate, acrylate, and other vinyl monomers, e.g., vinyl cyanide monomers and acrylonitriles, useful in the monomer mixture include, but are not limited to iso-octyl methacrylate, iso-octyl acrylate, lauryl acrylate, lauryl methacrylate, stearyl acrylate, stearyl methacrylate, isobornyl acrylate, isobornylmethacrylate, methoxy ethyl acrylate, methoxy methacrylate, 2-ethoxy ethyl acrylate, 2-ethoxy ethyl methacrylate, and methacrylate monomers, styrene and its derivatives, acrylamide, or methacrylamide. Monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like may be used. Small levels of multifunctional monomers as crosslinking agents may also be used. Mixtures of any or all of these are also suitable.

Preferred are methyl acrylate, methyl methacrylate, ethyl acrylate, ethyl methacrylate, propyl acrylate, propyl methacrylate, n-iso- and tert-butyl acrylate, n-iso- and tert-butyl methacrylate, 2-ethylhexyl acrylate, and norbornyl acrylate. More preferred are n-butyl acrylate, methyl acrylate, ethyl acrylate, and 2-ethylhexyl acrylate.

The at least one ethylenically unsaturated monomer may be present in the polymeric particles of the first embodiment emulsion polymer composition at levels of from 1.0 weight percent to 59.09 weight percent, based on the overall weight of the polymeric particles, on a dry basis. For example, the at least one ethylenically unsaturated monomer may be present in the polymeric particles of the first embodiment at from 2.0 to 40 wt. %, or from 10 to 30 wt. %, or from 50 to 59 wt. % or from 15 to 25 wt. %, or from 20 to 55 wt. %, or from 40 to 50 wt. %, based on the overall weight of the polymeric particles, on a dry basis.

The at least one ethylenically unsaturated monomer may be present in the polymeric particles of the second embodiment emulsion polymer composition at levels of from 5 weight percent to 60 weight percent, based on the overall weight of the polymeric particles, on a dry basis. For example, the at least one ethylenically unsaturated monomer may be present in the polymeric particles of the second embodiment at from 2.0 to 40 wt. %, or from 10 to 30 wt. %, or from 50 to 59 wt. % or from 15 to 25 wt. %, or from 20 to 55 wt. %, or from 40 to 50 wt. %, based on the overall weight of the polymeric particles, on a dry basis.

In an embodiment, the emulsion polymer composition may comprise, in polymerized form, acid-containing monomers, selected from but not limited to sulfonic acid-functionalized ethylenically unsaturated monomers such as 2-acrylamido-2-methylpropane sulfonic acid (AMPS), sodium vinyl sulfonate (SVS), acrylic acid, and methacrylic acid. These monomers can be present in polymerized form at a level from 0.01 weight percent and 2.5 weight percent based on the overall dry weight of the polymeric particles.

In an embodiment, the emulsion polymer composition may comprise, in polymerized form, a monomer selected from vinyl versatate in an amount between 0.1 weight percent and 10 weight percent. Other suitable monomers may be selected from, for example, vinyl esters of tertiary substituted α-carbon carboxylic acids and vinyl esters of C7-C20 carboxylic acids. Mixtures of any or all of these are suitable as well.

Monomer c) Hydrolyzable Silane Monomer in the First Embodiment Emulsion Polymer Composition Non-limiting examples of suitable hydrolyzable silane co-monomers in the first embodiment emulsion polymer composition include ethylenically unsaturated silicon compounds of the general formula $R'SiR_{0-2}(OR)_{1-3}$, where the number of R and OR moieties is such that the silicon is tetravalent. R' is an organofunctional substituted alkylene, arylene or aralkylene group, which may have from two to thirty carbon atoms and R is an alkyl or alkoxy-substituted alkyl, aryl, or aralkyl group having from two to ten carbon atoms. Each R group may be cyclic, branched or linear and contains no unsaturation. Preferably, the ethylenically unsaturated silane compound is selected from the group consisting of vinyltrimethoxysilane, vinyltriethoxysilane, methacryloxypropyl trimethoxysilane, methacryloxypropyl triethoxysilane, and methacryloxypropyl tripropoxysilane.

The hydrolyzable silane co-monomers in the first embodiment emulsion polymer composition may comprise from 0.01 weight percent to 4.0 weight percent, based on the overall dry solids weight of the polymeric particles in the first embodiment emulsion polymer composition, of the hydrolyzable silane monomer. For example, the hydrolyzable silane comonomer may be present at from 0.05 to 1.0 wt. %, based on the overall dry solids weight of the polymeric particles in the first embodiment emulsion polymer composition. The hydrolysable silane may be present in the first embodiment at from 0.05 to 0.5 wt. %, or from 0.8 to 1.0 wt. % or from 1.0 to 3.0 wt. % or from 2.0 to 3.5 wt. %, or from 0.06 to 0.9 wt. %, based on the overall dry solids weight of the polymeric particles in the first embodiment emulsion polymer composition.

Monomer c) Hydrolyzable Silane in the Second Embodiment Emulsion Polymer Composition Non-limiting examples of suitable hydrolyzable silane compounds in the second embodiment emulsion polymer composition include silicon compounds of the general formula $R'SiR_{0-2}(OR)_{1-3}$, where the number of R and OR moieties is such that the silicon is tetravalent. R' is an organofunctional substituted alkylene, arylene or aralkylene group, which may have from two to thirty carbon atoms and may contain heteroatoms such as oxygen or sulfur. The R' functional group may contain functional groups that are reactive toward heteroatoms contained in the vinyl acrylic emulsion polymer composition, such as heteroatom-terminating monomers in polymerized form in the emulsion polymer composition. R is an alkyl or alkoxy-substituted alkyl, aryl, or aralkyl group having from two to ten carbon atoms. Each R group may be cyclic, branched or linear and contains no unsaturation. Preferably, the hydrolysable silane compound in the second embodiment is selected from the group consisting of trialkoxy silanes, tetraalkoxysilanes, epoxy functionalized trialkoxy silanes. The hydrolysable silane in the second embodiment emulsion polymer composition may comprise glycidylpropyl trimethoxysilane. The hydrolyzable silicon compound may be selected from the group consisting of hydrolyzable epoxy silanes, hydrolyzable amino silanes, hydrolyzable mercapto silanes, hydrolyzable alkoxy silane compounds having the formula $(R^6)$n-Si—$(OR^7)_{4-n}$, wherein n is 0, 1, 2 or 3, and $R^6$ and $R^7$ are each independently a straight-chain or branched C1-C16 alkyl, and mixtures thereof.

Suitable hydrolyzable epoxy silanes may comprise, for example, 3-glycidoxypropyl trimethoxysilane and 3-glycidoxypropyl triethoxysilane. Further suitable hydrolyzable epoxy silanes include silane oligomers comprising, for example, epoxy functionalities.

Suitable hydrolyzable amino silanes may comprise, for example, 3-(2-aminoethylamino)propyl trimethoxysilane, and 3-(2-aminoethylamino)propyl methyldimethoxysilane.

Suitable hydrolyzable mercapto silanes may comprise, for example, mercaptosilanes of the general formula HS—$(CR^4_2)1-3$—$SiR^5_3$, where $R^4$ is identical or different and is H or a C1 to C6 alkyl group, $R^5$ is identical or different and is a C1 to C6 alkyl group or C1 to C6 alkoxy group, at least one of the radicals $R^5$ being an alkoxy group. The hydrolyzable mercapto silanes may be selected from the group consisting of 3-mercaptopropyl triethoxysilane, 3-mercaptopropyl trimethoxysilane, and 3-mercaptopropyl methyldimethoxysilane.

Suitable hydrolyzable alkoxy silane compounds include, for example, silanes of the formula $(R^6)_n$—Si—$(OR^7)_{4-n}$, wherein n is 0, 1, 2 or 3, and $R^6$ and $R^7$ are each independently a straight-chain or branched C1-C16 alkyl. The hydrolyzable silane compound may be selected from the group consisting of tetramethoxysilane, tetraethoxysilane, methyltrimethoxysilane, ethyltrimethoxysilane, propyltrimethoxysilane, butyltrimethoxysilane, pentyltrimethoxysilane, hexyltrimethoxysilane, methyltriethoxysilane, ethyltriethoxysilane, propyltriethoxysilane, butyltriethoxysilane, pentyltriethoxysilane and hexyltriethoxysilane. Particularly preferred hydrolyzable silicon compounds are 3-glycidoxypropyl trimethoxysilane, 3-glycidoxypropyl triethoxysilane, 3-(2-aminoethylamino)propyl trimethoxysilane, 3-mercaptopropyl trimethoxysilane, tetraethoxysilane, methyltriethoxysilane, hexyltriethoxysilane, and mixture thereof.

The hydrolyzable silane in the second embodiment emulsion polymer composition may comprise from 0.01 weight percent to 4.0 weight percent, based on the overall dry solids weight of the polymeric particles in the second embodiment emulsion polymer composition, of the hydrolyzable silane monomer. For example, the hydrolyzable silane may be present at from 0.5 to 2.0 wt. % or from 1.0 to 3.0 wt. %, For example, the hydrolyzable silane may be present at from 0.05 to 1.0 wt. %, based on the overall dry solids weight of the polymeric particles in the second embodiment emulsion polymer composition. The hydrolysable silane comonomer may be present in the first embodiment at from 0.05 to 0.5 wt. %, or from 0.8 to 1.0 wt. % or from 1.0 to 3.0 wt. % or from 2.0 to 3.5 wt. %, or from 0.06 to 0.9 wt. %, based on the overall dry solids weight of the polymeric particles in the second embodiment emulsion polymer composition.

Particle Size Distribution and Number of Modes in Population of Particles Sizes:

As is known in the art, emulsion polymerization forms a population of varying sizes of the polymeric particles that comprise the emulsion polymer. This population thus has a particle size distribution, which may be characterized by a weight average particle size Dw, a number average particle size Dn, and the ratio between them, Dw/Dn. Typically, the particle size distribution has at least one mode, which is seen as a peak on a chart showing the number (or the weight) of particles having a certain size. According to some embodiments, the population of particle sizes disclosed herein may have more than one mode, i.e. more than one such peak. These modes are referred to herein as $mode_i$, and each $mode_i$ has a respective weight average particle size $Dw_i$ and a respective number average particle size $Dn_i$. For example, if i=1, the distribution of particle sizes in the population of particles is monomodal and the population of particle sizes thus has one $Dw_1$ and one $Dn_1$ and a corresponding single $Dw_1/Dn_i$. If i=2, the distribution of particle sizes in the population of particles is bimodal and the population thus has two weight average particle sizes: $Dw_1$, $Dw_2$; two number average particle sizes: $Dn_1$, $Dn_2$; and two ratios thereof: $Dw_1/Dn_1$ and $Dw_2/Dn_2$. Additional embodiments corresponding to higher multi-modal particle size distributions, i.e., i=3, i=4, i=5, and higher can be envisioned by those having ordinary skill in the art and are encompassed by the present disclosure.

Weight Average Particle Size:

The weight average particle size, also referred to in the art as the "weight mean diameter" or "Dw", or "weight mean particle size" of the polymeric particles in the emulsion is measured using Disc Centrifugation Photosedimentometry ("CPS Instruments"). Dynamic light scattering methods generally are not preferred, as that technique may not resolve particle size distributions within the particle size ranges generated in the emulsion polymerization. The weight average particle size may range from 0.05 µm to 2.0 µm, dependent upon the capabilities of the instrument. The weight average particle size may be less than 2.0 µm, or less than 0.8 µm, or less than 0.5 µm, or less than 0.25 µm, or less than 0.2 µm, or less than 0.1 µm. The smallest suitable weight average particle size is 0.05 µm.

Number Average Particle Size:

The number average particle size, also referred to in the art as the "number mean diameter" or "Dn", or "number mean particle size" of the polymeric particles in the emulsion is measured using Disc Centrifugation Photosedimentometry ("CPS Instruments"). The number average particle size may range from 0.05 µm to 2.0 µm, dependent upon the capabilities of the instrument. The number average particle size may be less than 2.0 µm, or less than 0.8 µm, or less than 0.5 µm, or less than 0.25 µm, or less than 0.2 µm, or less than 0.1 µm.

Ratio of Weight Average Particle Size Dw to Number Average Particle Size Dn:

As is known in the art, emulsions are formed from a population of varying sizes of the polymeric particles that comprise the emulsion. As described above, this population thus has at least one mode and each $mode_i$ has a respective particle size distribution, which may be characterized by a respective weight average particle size $Dw_i$, a respective number average particle size $Dn_i$, and a respective ratio between them, $Dw_i/Dn_i$.

As described in more detail below, the particle size distribution of the emulsion polymer compositions disclosed herein are defined as those measured using disc centrifuge photosedimentometry. Accordingly, the population of sizes of polymeric particles comprises at least one mode, and each $mode_i$ comprises a respective weight average particle size $Dw_i$ as measured by disc centrifuge photosedimentometry and a respective number average particle size $Dn_i$ as measured by disc centrifuge photosedimentometry. As discussed above, the population of sizes of polymeric particles comprises at least one mode, and each $mode_i$ comprises a respective weight average particle size $Dw_i$ as measured by disc centrifuge photosedimentometry and a respective number average particle size $Dn_i$ as measured by disc centrifuge photosedimentometry and wherein for each $mode_i$, $Dw_i/Dn_i$ is 2.0 or less.

Figure 2:
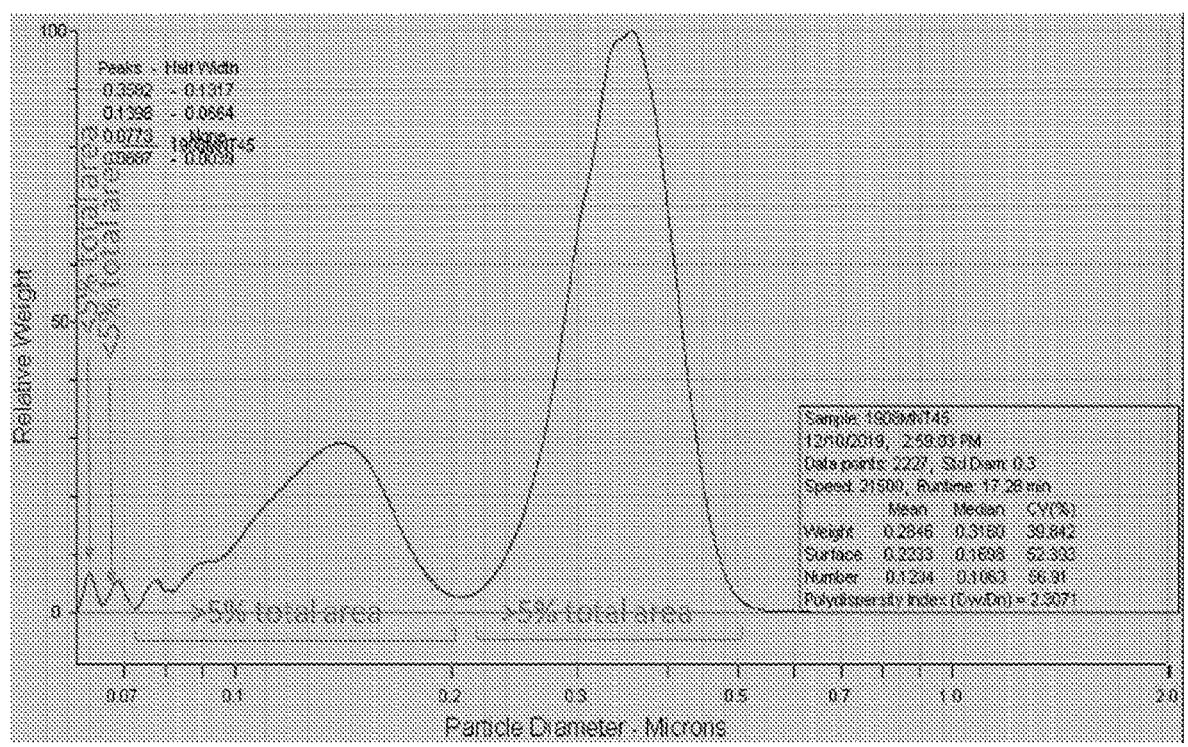
FIG. 2 illustrates a criteria for measuring particle size distribution.

Disc Centrifuge Photosedimentometry:

The $Dw_i$, and $Dn_i$ of each mode of the population of the polymer particles disclosed herein are measured using disc centrifuge photosedimentometry. Polymer particles are separated using disc centrifuge photosedimentometry and an integral curve is generated that corresponds to the relative amount of polymer particles eluting from the disc as a function of time, which corresponds to different particle sizes. This integral curve is converted to the differential scans of the type shown in FIGS. 4-7. For mono-modal particle size distributions, a peak can be defined by the increase and the decrease relative to the baseline. For multi-modal polymer particle distributions, a particle size distribution is defined based on the following criteria. These criteria are illustrated in FIG. 1 and FIG. 2.

a) As illustrated in FIG. 1, a peak is considered resolved, i.e. is a separate mode of the polymer particle size distribution if the valley between two peaks has a peak height that is less than 50% of the peak height of the distribution of the lowest height; and b) A peak is considered a $mode_i$ if it satisfies criteria a) and, as shown in FIG. 2, also contributes to >5% by area of the total area in the scan of the population of particle sizes.

The ratio of weight average particle size, or Dw, to number average particle size, or Dn; Dw/Dn, also referred to as the polydispersity index (PDI) of the particle sizes, provides a way to express the range of sizes that are present in the emulsion polymer composition. Without wishing to be bound by theory, the inventors have found that when the $Dw_i/Dn_i$ (PDI) of each $mode_i$ in a particle size population of the vinyl acrylic emulsion disclosed herein is 2 or less, and the vinyl acrylic emulsion further comprises a hydrolysable silane, the cleansability of a coating formed form this elution, as measured according to the MPI cleansability tests described in at least one of MPI 138-141 and 143-148, is much better than if only one of these criteria are met.

In the embodiments of the invention disclosed herein, Disc Centrifuge Photosedimentometry is used to analyze the particle size and particle size distribution of a population of polymeric emulsion polymers with high resolution. This technique separates the distributions of particles via centrifugation and sedimentation. The ratio of weight average particle size, or Dw, to number average particle size, or Dn, (Dw/Dn) also referred to as the polydispersity index (PDI) of the particle sizes, provides a way to express the range of sizes that are present in the population of polymeric particles in the emulsion.

Figure 4:
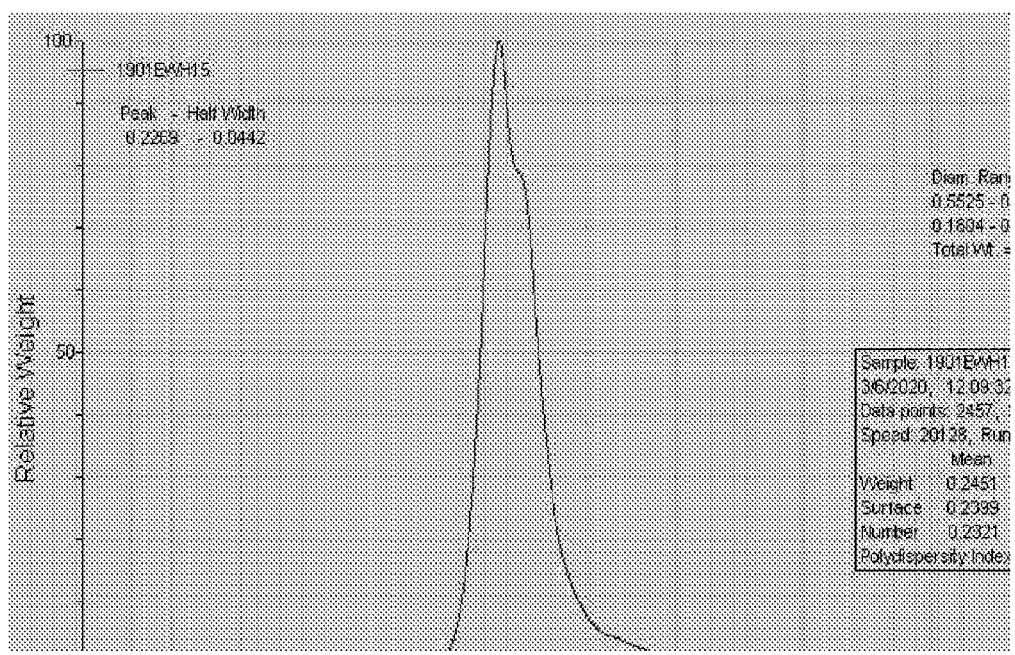
FIG. 4 shows particle size distributions for emulsion polymers according to Examples 1-4 and Comparative Example 1.
Figure 6:
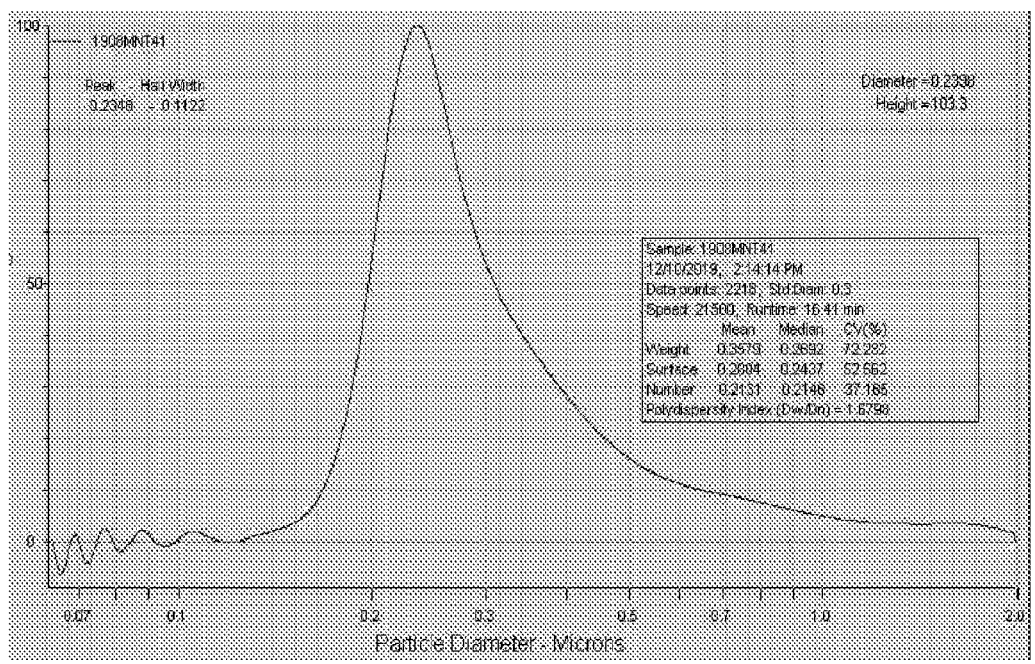
FIG. 6 shows a particle size distribution for emulsion polymers according to Example 5.

FIG. 4 illustrates a representative disc centrifuge particle size measurement of an emulsion polymer with a mono-modal particle size distribution prepared through methods by disclosed herein. Analysis shows the single particle size population with a Dw of 0.245, a Dn of 0.232, and a PDI (Dw/Dn) of 1.06. FIG. 6 illustrates a representative disc centrifuge particle size measurement of an emulsion polymer with a broader mono-modal particle size distribution prepared through methods by those skilled in the art. Analysis shows the single particle size population with a Dw of 0.358, a Dn of 0.213, and a PDI of 1.68.

Figure 7A:
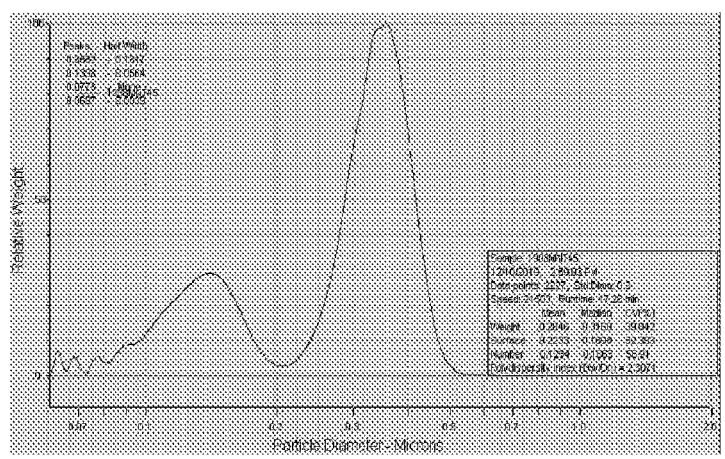
FIG. 7A shows a bimodal particle size distribution for emulsion polymers according to Example 6.
Figure 7B:
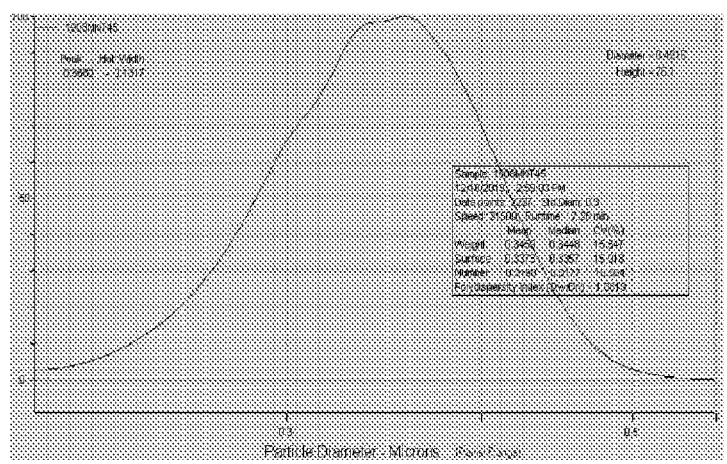
FIG. 7B shows the particle size distribution of one of the two modes in FIG. 7A.
Figure 7C:
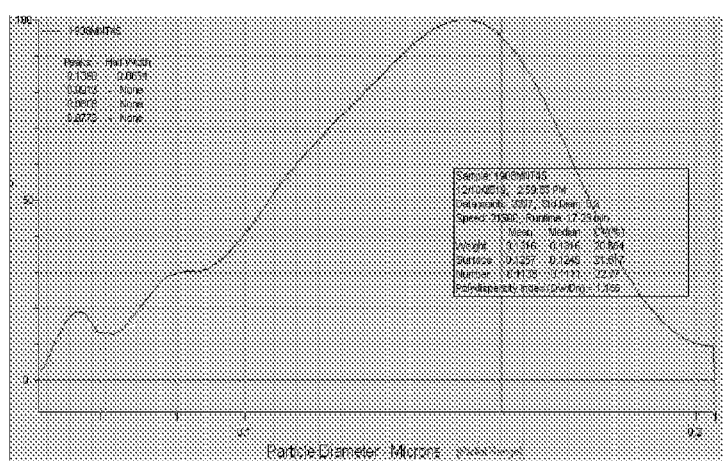
FIG. 7C shows the particle size distribution of the other of the two modes in FIG. 7A.

FIGS. 7A, 7B, and 7C illustrate a representative disc centrifuge particle size measurement of an emulsion polymer with a multi-modal particle size distribution prepared through methods disclosed herein. FIG. 7A illustrates both modes of the population on a single plot. Each of the two particle size modes in the population is measured separately and analysis and are illustrated separately in FIGS. 7B and 7C. FIG. 7C shows the smaller mode has a Dw of 0.132, a Dn of 0.114, and a PDI of 1.158. FIG. 7B shows the larger mode has a Dw of 0.346, a Dn of 0.320, and a PDI of 1.08.

Figure 5:
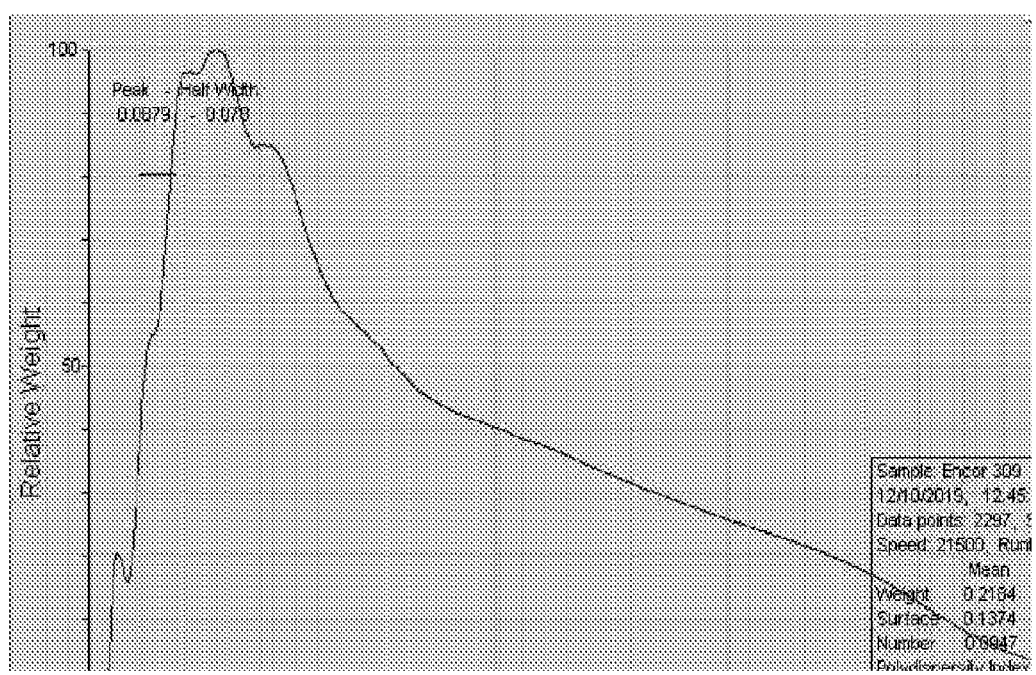
FIG. 5 shows a particle size distribution for emulsion polymers according to Comparative Example 2.

FIG. 5 illustrates a representative disc centrifuge particle size measurement of a comparative emulsion polymer with a population of polymer particles having a particle size distribution, as measured by the ratio Dw/Dn, of greater than 2.0.

According to embodiments of the invention, the ratio of weight average particle size to number average particle size for each $mode_i$ may range from 1.0 to 2.0. The ratio of weight average particle size to number average particle size for each $mode_i$ may range from 1.1 to 1.95, or from 1.1 to 1.9, or from 1.1 to 1.85, or from 1.1 to 1.8, or from 1.1 to 1.75, or from 1.1 to 1.7, or from 1.1 to 1.65, or from 1.1 to 1.6, or from 1.1 to 1.55, or from 1.1 to 1.5, or from 1.1 to 1.45, or from 1.1 to 1.4, or from 1.1 to 1.35, or from 1.1 to 1.3, or from 1.1 to 1.25, or from 1.1 to 1.2, or from 1.1 to 1.15.

Glass Transition Temperatures of the Emulsion Polymer Composition:

The vinyl acrylic emulsion polymer composition that comprises the polymeric particles as described herein are composed of co-monomers so as to generate polymers with a glass transition temperature (Tg) in the range of −10° C. and 40° C., as measured by differential scanning calorimetry (DSC). Preferred glass transition temperatures are in the range of −10° C. and 20° C., with more preferred ranges from 0° C. and 15° C.

Protective Colloid Stabilizers:

In an embodiment, the emulsion polymer composition that comprises the polymeric particles as described herein may optionally further comprise from 0.01 weight percent to 2.0 weight percent based on the total weight of the polymeric particles of a protective colloid stabilizer that is partially or completely grafted to the emulsion polymer. In an embodiment, the colloidal stabilizer may be hydroxyethyl cellulose. Preferred levels for protective colloidal stabilizers are 0.05 weight percent to 0.75 weight percent based on the total dry weight of the polymeric particles.

Coating Compositions:

In an embodiment, the emulsion polymer composition that comprises the polymeric particles as described herein, may be formulated into a coating composition comprising an aqueous medium. The coating composition comprising the emulsion polymer composition may comprise other further components. The further component may comprise at least one pigment. The further component may comprise for example, at least one additive such as dispersants, surfactants, defoamers, pH adjusters, extenders, opacifiers, rheology modifiers, coalescent agents, colorants, tints, pigments, dyes, titanium dioxide, fillers, brightness enhancers, thickeners, freeze-thaw and/or open time additives, antioxidants, UV stabilizers, and mixtures thereof.

In another embodiment, a method of coating a substrate with the coating composition is disclosed. The method of coating a substrate may comprise a step of applying a layer comprising the coating composition comprising the emulsion polymer composition onto the surface of the substrate and a step of drying the layer of coating composition to obtain a film, wherein the film passes a cleansability test according to at least one of MPI #143-148 and MPI #138-141.

The coating composition may be applied by conventional techniques, such as brushing, rolling, or spraying the coating composition onto a variety of substrate surfaces. The substrates may include without limitation, wood, fabricated wood, paper, cardboard, textiles, synthetic resins, ceramics, ferrous metals, non-ferrous metals, stone, concrete, plaster, and the like.

Process for Forming the First Embodiment Emulsion Polymer Composition

One suitable process for forming the first embodiment emulsion polymer composition comprising polymeric particles is disclosed. The process comprises the following steps:

First, water, surfactant, and a portion of a first monomer mixture are combined in a vessel and heated. The first monomer mixture comprises: a) at least one monomer comprising vinyl acetate; b) at least one ethylenically unsaturated monomer; and c) at least one monomer selected from the group of hydrolyzable silanes. The at least one ethylenically unsaturated monomer b) is not selected from a) or c). Monomer a), monomer b), and monomer c) together total 100 weight percent. The first monomer mixture is then polymerized through the addition of free radical initiator to form seed particles as the second step.

Third, a second portion of free radical initiator and a second monomer mixture are added separately to the seed particles in the vessel over a period of 1-5 hours. The second monomer mixture may comprise: d) at least one monomer comprising vinyl acetate; e) at least one ethylenically unsaturated monomer; and f) at least one monomer selected from the group of hydrolyzable silanes. The at least one ethylenically unsaturated monomer e) is not selected from d) at least one monomer comprising vinyl acetate or f) at least one monomer selected from the group of hydrolyzable silanes. Monomer d), monomer e), and monomer f) together total 100 weight percent. The second monomer mixture may have the same composition as the first monomer mixture, or the second monomer mixture may have a composition that is different from that of the first monomer mixture. The fourth step is polymerizing, on the seed particles, the second monomer mixture to form the polymeric particles. The polymeric particles have a weight average particle size and a number average particle size as measured by disc centrifugation photosedimentometry. The ratio of the weight average particle size to the number average particle size ($D_w/D_n$) as measured by disc centrifugation photosedimentometry may be 2.0 or less.

Process for Forming the Second Embodiment Emulsion Polymer Composition

One suitable process for forming the second embodiment emulsion polymer composition comprising polymeric particles is also disclosed. As with the difference between the first and second emulsion polymer compositions, the difference between these first and second process embodiments is the presence or absence, respectively, of the hydrolyzable silane in the monomer mixtures. The process comprises the following steps:

First, water, surfactant, and a portion of a first monomer mixture are combined in a vessel and heated. The first monomer mixture comprises: a) at least one monomer comprising vinyl acetate; and b) at least one ethylenically unsaturated monomer. The at least one ethylenically unsaturated monomer b) is not selected from a). Monomer a), and monomer b) together total 100 weight percent. The first monomer mixture is then polymerized through the addition of free radical initiator to form seed particles as the second step.

Third, a second portion of free radical initiator and a second monomer mixture are added separately to the seed particles in the vessel over a period of 1-5 hours. The second monomer mixture (which may be the same as or different from the first monomer mixture) may comprise: d) at least one monomer comprising vinyl acetate; and e) at least one ethylenically unsaturated monomer. The at least one ethylenically unsaturated monomer e) is not selected from d) at least one monomer comprising vinyl acetate. Monomer d) and monomer e) together total 100 weight percent. The fourth step is polymerizing, on the seed particles, the second monomer mixture to form the polymeric particles. The polymeric particles have a weight average particle size and a number average particle size as measured by disc centrifugation photosedimentometry. The ratio of the weight average particle size to the number average particle size ($D_w/D_n$) as measured by disc centrifugation photosedimentometry may be 2.0 or less.

For both of these first and second embodiment processes, the polymeric particles may comprise from 3 weight percent to 20 weight percent of the first monomer mixture (in polymerized form). The polymeric particles may comprise from 5-10 wt. %, or from 4-9 wt. %, or from 5-8 wt. % or from 6-9 wt. % or from 6.6-7.5 wt. % of the first monomer mixture (in polymerized form).

Anionic Surfactant:

In both of these first or second embodiment processes, the anionic surfactant may comprise, for example, sodium sulfonate, sodium lauryl sulfate, sodium dodecylbenzenesulfonate, potassium stearate, sodium dioctyl sulfosuccinate, sodium dodecyldiphenyloxide disulfonate, onylphenoxyethylpolyethoxyethyl sulfate ammonium salt, sodium styrene sulfonate, sodium dodecyl allyl sulfosuccinate, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium α-olefin (C14-C16)sulfonate, sulfates of hydroxyalkanols, tetrasodium N-(1,2-dicarboxy ethyl)-N-octadecylsulfosinnamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypolyethoxyethyl sulfate and combinations thereof. Suitable amounts are from 0.1-10 wt. % or from 0.1-5 wt. % of the reaction mixture.

Nonionic Surfactant:

Non-limiting examples of suitable nonionic emulsifiers include acyl, alkyl, oleyl, and alkylaryl ethoxylates. These products are commercially available, for example, under the tradename Genapol™, Lutenso™ or Emuan™. They include, for example, ethoxylated mono-, di-, and tri-alkylphenols (EO degree: 3 to 80, alkyl substituent radical: C4 to C12) and also ethoxylated fatty alcohols (EO degree: 3 to 80; alkyl radical: C8 to C36), especially C10-C14 fatty alcohol (EO 3-80) ethoxylates, C11-C15 oxo-process alcohol (EO 3-80) ethoxylates, C16-C18 fatty alcohol (EO 3-80) ethoxylates, C11 oxo-process alcohol (EO 3-80) ethoxylates, C13 oxo-process alcohol (EO 3-80) ethoxylates, polyoxyethylenesorbitan monooleate with 20 ethylene oxide groups, copolymers of ethylene oxide and propylene oxide having a minimum ethylene oxide content of 10% by weight, the polyethylene oxide (EO 3-80) ethers of oleyl alcohol, and the polyethene oxide (EO 3-80) ethers of nonylphenol. Particularly suitable are the polyethylene oxide (EO 3-80) ethers of fatty alcohols, more particularly of oleyl alcohol, stearyl alcohol or C11 alkyl alcohols. Suitable amounts are from 0.1-10 wt. % or from 0.1-5 wt. % of the reaction mixture.

Free Radical Initiators:

The free radical initiators suitable for the polymerization of the monomers used to prepare the emulsion polymer particles as described herein for both the first embodiment and the second embodiment processes may be any water soluble or water insoluble initiator suitable for aqueous emulsion polymerization. Examples of free radical initiators used in both the first embodiment and the second embodiment processes to prepare the emulsion polymer particles of the present application include, but are not limited to, hydrogen peroxide, tert-butyl peroxide, alkali metal persulfates such as sodium, potassium, and lithium persulfate, ammonium persulfate, and mixtures of such initiators with a reducing agent. The amount of initiator may be, for example, from 0.01 to 3 wt. %, or from 0.01-1 wt. % based on the total weight of monomer.

In some embodiments, a redox polymerization initiator system is used. In a redox free radical initiation system, a reducing agent may be used in conjunction with an oxidant. Reducing agents suitable for the aqueous emulsion polymerization include sulfites (e.g., alkali metal metabisulfite, hydrosulfite, and hyposulfite). In some embodiments, ascorbic acid derivatives, such as ascorbic acid, isoascorbic acid, or an alkali metal (iso)ascorbate salt, might also be a suitable reducing agent for the aqueous emulsion polymerization. In a redox system, the amount of reducing agent may be, for example, from 0.01 to 3 percent by weight based on the total amount of monomer.

Oxidizing agents (oxidants) include, for example, for example, hydrogen peroxide and ammonium or alkali metal persulfates, perborates, peracetates, peroxides, and percarbonates and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. The amount of oxidizing agent may be, for example, from 0.01 to 3 percent by weight, based on the total amount of monomer.

The free radical polymerization temperature typically is in the range of about 10° C. to 100° C. In the case of the persulfate systems, the temperature may be in the range of about 60° C. to about 100° C. In the redox system, the temperature may be in the range of about 30° C. to about 100° C., in the range of about 30° C. to about 60° C., or in the range of about 30° C. to about 45° C.

Test Procedures

Particle Size Measurement:

Disc Centrifuge Photosedimentometry is a high resolution analytical method used to analyze the particle size and particle size distribution of the polymeric emulsion polymers disclosed herein. A CPS Disc Centrifuge Model DC24000 UHR from CPS Instruments was used to conduct the separation and data collection and analyzed using CPSV95 software from CPS Instruments.

In disc centrifuge photosedimentometry, particles are separated by centrifugal sedimentation in a ring of liquid medium that has a slight density gradient different from that of the particle. This ring of liquid medium is formed within a clear rotation disc that spins up to 24,000 rpm. A dilute sample of latex is administered into this ring of liquid and the particles sediment at a rate depending on their size to the edge of the fluid ring. A detector monitors the scatter and reduction of light intensity from the particle interference. The time versus the detector beam intensity is converted to a size distribution using a modified version of Stokes' Law and Mie theory light scattering calculations.

The emulsion polymer samples were analyzed by first preparing an aqueous dispersion by adding 1-2 drops of emulsion polymer (~55 wt % emulsion polymer) into 10-20 milliliters (mL) of deionized water. For the emulsion polymer, the monomer composition was used to calculate a refractive index of 1.465 and a particle density of 1.142 g/mL. Next, 0.1 mL of the diluted sample was injected into the spinning disc filled with a sucrose gradient. Samples were analyzed relative to a 303±6 nanometer (nm) Nanosphere™ polystyrene standard (ThermoFisher Scientific), which have a density of 1.052 g/mL. To prepare the sucrose gradient, 2 wt % and 8 wt % sucrose solutions in HPLC-grade water were prepared and the auto-gradient pump generates a sucrose gradient on the disc from 2 wt % to 8 wt %. This gradient has a fluid density of 1.012 g/mL, a refractive index of 1.325, and a fluid viscosity of 1.1 centipoise (cPs). This is followed by a 1 mL dodecane cap to prevent evaporation of the water from the sucrose gradient. For these analyses, a standard disc was utilized at a disc speed of 24,000 rpm operating at ambient temperature. Single measurements were taken for the analyses reported herein.

Temperature of measurement: ambient; 20° C. to 25° C.
Particles were assumed to be spherical.
Light absorption of particles was assumed to be 0.
Any other details of analysis that are important for replication? NO Cleansability:

Cleansability was measured according to MPI standards issued May 4, 2016 for interior latex wall paints, i.e. the cleansability test in MPI standards #143-148 and MPI #138-141. These tests comprise the steps of applying a coating to be tested to a white plastic scrub panel and allowing it dry under specified conditions. After the appropriate dry time, three stains are applied to the coating (graphite, hot coffee, and a standard aqueous solution of nigrosine), and allowed to remain on the coating for 10 minutes before rinsing off the excess stains. The resulting stains are then subjected to mechanical scrubbing with a cellulosic sponge using an aqueous cleaning media. After scrubbing, the residual soap solution is gently rinsed off and the panels are allowed to dry overnight. o The staining of the coating is measured using the International COMMISSION ON ILLUMINATION (CIE) L*A*B COLOR SPACE ΔE COLOR DIFFERENCES. THE REFERENCE IS THE unstained surface. The reference for the color readings is the unstained surface along the scrubbing path on the panel. By definition, smaller ΔE color differences indicate better cleansability, since they indicate that the stained and the scrubbed surfaces are more alike in terms of color.

Figure 3:
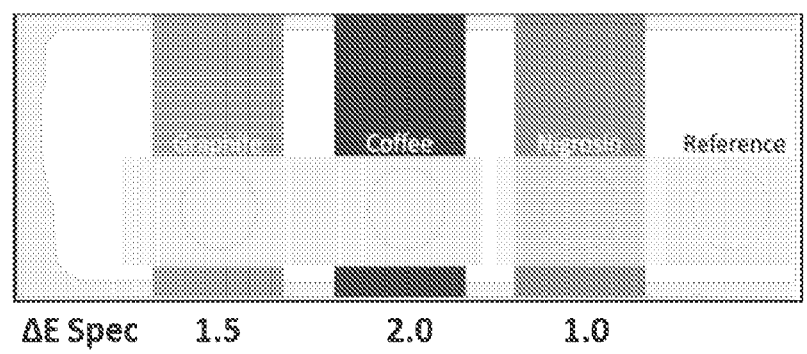
FIG. 3 shows an exemplary cleansability test panel.
Figure 3:
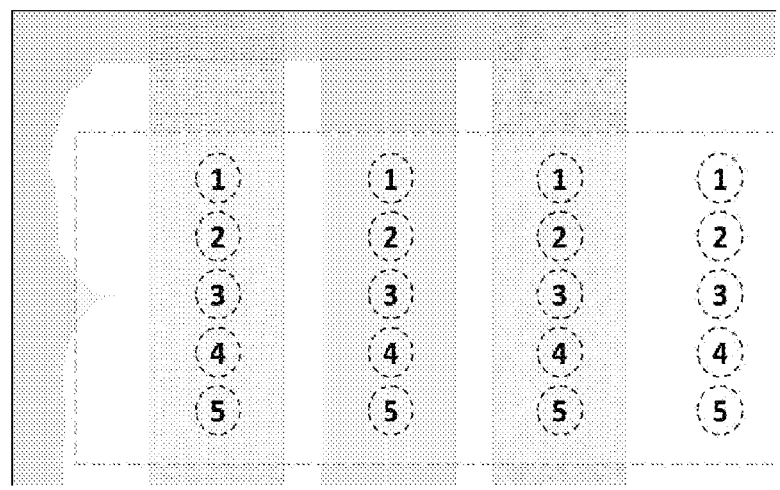

FIG. 3 shows an exemplary schematic representation of a typical test panel for the cleansability test. According to the MPI standards, the coating composition passes the test if the ΔE color differences are less than 1.5 for the graphite, less than 2.0 for the hot coffee, and less than 1.0 for the nigrosine. Smaller ΔE color differences indicate better cleansability, since they indicate that the stained and the scrubbed surfaces are more alike in terms of color differences.

Non-Limiting Aspects of the Invention may be Summarized as Follows:

Aspect 1: An emulsion polymer composition comprising a population of sizes of polymeric particles, wherein the polymeric particles comprise copolymer which comprises, in polymerized form:
a) between 40 weight percent and 95 weight percent, based on the overall weight of the polymeric particles, of at least one monomer comprising vinyl acetate;
b) between 1.0 weight percent and 59.09 weight percent, based on the overall weight of the polymeric particles, of at least one ethylenically unsaturated monomer; and
c) between 0.01 weight percent and 4.0 weight percent, based on the overall weight of the polymeric particles, of at least one monomer selected from free radical polymerizable hydrolyzable silanes, wherein the at least one ethylenically unsaturated monomer b) is not selected from a) or c), wherein monomer a), monomer b), and monomer c) together total 100 weight percent; and wherein the population of sizes of polymeric particles comprises at least one mode, and wherein each mode$_i$ comprises a respective weight average particle size $Dw_i$ as measured by disc centrifuge photosedimentometry and a respective number average particle size $Dn_i$ as measured by disc centrifuge photosedimentometry and wherein for each mode$_i$, $Dw_i/Dn_i$ is 2.0 or less.

Aspect 2: The emulsion polymer composition according to Aspect 1, wherein the at least one ethylenically unsaturated monomer b) is selected from the group consisting of alkyl(meth)acrylate monomers, (meth)acrylamide monomers, and mixtures thereof.

Aspect 3: The emulsion polymer composition according to either of Aspect 1 or Aspect 2, wherein the at least one ethylenically unsaturated monomer b) is selected from the group consisting of ethyl(meth)acrylate, butyl acrylate and mixtures thereof.

Aspect 4: The emulsion polymer composition according to any of Aspects 1-3, wherein the copolymer further comprises, in polymerized form, at least one monomer selected from the group consisting of 2-acrylamido-2-methylpropane sulfonic acid (AMPS), sodium vinyl sulfonate (SVS), acrylic acid, methacrylic acid, and mixtures thereof in an amount between 0.01 weight percent and 2.5 weight percent, based on the overall dry weight of the polymeric particles.

Aspect 5: The emulsion polymer composition according to any of Aspects 1-4, wherein the copolymer further comprises, in polymerized form, at least one monomer selected from the group consisting of vinyl versatate, vinyl esters of tertiary substituted α-carbon carboxylic acids, vinyl esters of C7-C20 carboxylic acids, and mixtures thereof, in an amount between 0.4 weight percent and 4 weight percent, based on the overall dry weight of the polymeric particles.

Aspect 6: The emulsion polymer composition according to any of Aspects 1-5, further comprising from 0.01 weight percent to 1 weight percent based on the total dry weight of the polymeric particles, of hydroxyethyl cellulose in copolymerized form.

Aspect 7: A coating composition comprising an emulsion polymer composition according to any of Aspects 1-6 and at least one further component dispersed in an aqueous medium.

Aspect 8: The coating composition according to Aspect 7, the at least one further component comprising at least one pigment.

Aspect 9: The coating composition according to either Aspect 7 or Aspect 8, further comprising at least one additive selected from the group consisting of dispersants, surfactants, defoamers, pH adjusters, extenders, opacifiers, rheology modifiers, coalescent agents, colorants, and mixtures thereof.

Aspect 10: A method of coating a substrate wherein the method comprises a step of applying a layer comprising the coating composition according to any of Aspects 7-9 on a surface of the substrate and a step of drying the layer of coating composition to obtain a film, wherein the film passes a cleansability test in at least one of MPI #143-148 and MPI #138-141.

Aspect 11: An emulsion polymer composition comprising a population of sizes of polymeric particles, wherein the polymeric particles comprise copolymer which comprises, in polymerized form:
a) between 40 weight percent and 95 weight percent, based on the overall weight of the polymeric particles, of at least one monomer comprising of vinyl acetate; and
b) between 5 weight percent and 60 weight percent, based on the overall weight of the polymeric particles, of at least one ethylenically unsaturated monomer, wherein the at least one ethylenically unsaturated monomer b) is not selected from monomer a), wherein monomer a), and monomer b) together total 100 weight percent; and wherein the population of sizes of polymeric particles comprises at least one mode, and wherein each mode$_i$ comprises a respective weight average particle size Dw$_i$ as measured by disc centrifuge photosedimentometry and a respective number average particle size Dn$_i$ as measured by disc centrifuge photosedimentometry and wherein for each mode$_i$, Dw$_i$/Dn$_i$ is 2.0 or less; and wherein the emulsion polymer composition further comprises between 0.1 and 5 weight percent, based on the total dry weight of the polymeric particles, of at least one hydrolyzable silane selected from trialkoxy silanes, tetraalkoxysilanes, and mixtures thereof.

Aspect 12: The emulsion polymer composition according to Aspect 11, wherein the hydrolyzable silane is selected from epoxy functionalized trialkoxy silanes.

Aspect 13: The emulsion polymer composition according to either of Aspect 11 or Aspect 12, wherein the at least one ethylenically unsaturated monomer b) is selected from the group consisting of alkyl(meth)acrylate monomers, (meth) acrylamide monomers, and mixtures thereof.

Aspect 14: The emulsion polymer composition according to any of Aspects 11-13, wherein the at least one ethylenically unsaturated monomer b) is selected from the group consisting of alkyl(meth)acrylate monomers, and mixtures thereof.

Aspect 15: The emulsion polymer composition according to any of Aspects 11-14, wherein the at least one ethylenically unsaturated monomer b) is selected from the group consisting of ethyl(meth)acrylate, butyl acrylate, and mixtures thereof.

Aspect 16: The emulsion polymer composition according to any of Aspects 11-15, wherein the copolymer further comprises, in polymerized form, between 0.01 weight percent and 1.5 weight percent, based on the overall dry weight of the polymeric particles, of at least one monomer selected from the group consisting of 2-acrylamido-2-methylpropane sulfonic acid (AMPS), sodium vinyl sulfonate (SVS), acrylic acid, and methacrylic acid, and mixtures thereof.

Aspect 17: The emulsion polymer composition according to any of Aspects 11-16, wherein the copolymer comprises, in polymerized form, between 0.4 weight percent and 4 weight percent, based on the overall dry weight of the polymeric particles, of a monomer selected from the group consisting of vinyl versatate, vinyl esters of tertiary substituted α-carbon carboxylic acids, vinyl esters of C7-C20 carboxylic acids, and mixtures thereof.

Aspect 18: The emulsion polymer composition according to any of Aspects 11-17, further comprising from 0.01 weight percent to 1 weight percent based on the total dry weight of the polymeric particles of a colloidal stabilizer, selected from hydroxyethyl cellulose in copolymerized form.

Aspect 19: A coating composition comprising an emulsion polymer composition according to any of Aspects 11-18 and at least one further component dispersed in an aqueous medium.

Aspect 20: The coating composition according to Aspect 19, the at least one further component comprising at least one pigment.

Aspect 21: The coating composition according to either of Aspect 19 or Aspect 20, further comprising at least one additive selected from the group consisting of dispersants, surfactants, defoamers, pH adjusters, extenders, opacifiers, rheology modifiers, coalescent agents, colorants and mixtures thereof.

Aspect 22: A method of coating a substrate wherein the method comprises a step of applying a layer comprising the coating composition according to any of Aspects 19-21 on a surface of the substrate and a step of drying the layer of coating composition to obtain a film, wherein the film passes a cleansability test in at least one of MPI #143-148 and MPI #138-141.

EXAMPLES

The compositions shown in Table 1 were prepared according to the procedures outlined in Examples 1-6 and Comparative Examples 1-2. The compositions according to the invention were prepared as described in Examples 1-6. The comparative examples 1-2 were prepared according to the emulsion polymer procedures shown, and represent the prior art. The weight average and number average particle sizes, as well as the ratio of the weight average and number average particle sizes were measured using disc centrifuge photosedimentometry. In the tables, the following abbreviations are used:

VA=vinyl acetate; BA=butyl acrylate; VTMS=vinyl trimethoxy silane as a comonomer; GP-TMS= glycidylpropyl trimethoxysilane added after polymerization; Dw=weight average particle size in µm; Dn=number average particle size in µm; Dw/Dn=ratio of weight average particle size to number average particle size. All monomers and additives are shown as weight percent, based on the total dry weight of the polymeric particles.

Example 1: Preparation of Emulsion Polymer Composition with 0.1 Weight Percent Hydrolyzable Silane Monomer and Narrow Particle Size Distribution In a three-liter jacketed glass reactor equipped with dual impellers, a reflux condenser, a stainless steel feed line, and a stainless steel thermocouple is added: 2.33 g sodium acetate, 0.6 g anionic surfactant, 4.7 g anionic surfactant, 1.94 g nonionic surfactant, 1.94 g of a 25% solution sodium vinyl sulfonate, and 0.5 g hydroxyethyl cellulose as colloidal stabilizer, and 552 g water. The reactor was then heated to 65° C.

A monomer mixture was prepared by combining 675.9 g vinyl acetate, 19.36 g vinyl versatate, 272.61 g butyl acrylate, and 1.0 g vinyl trimethoxysilane (VTMS).

A third stream feed was prepared by combining 25 g water, 18.5 g nonionic surfactant, 16 g anionic surfactant, and 4.8 g 2-arylamido-2-methylpropane sulfonic acid, aqueous sodium salt.

The reactor was charged with 7.0% by weight of the monomer mixture, followed by the addition of 0.2 g sodium persulfate in 5 g water, then 0.2 g sodium metabisulfite in 5 g water. The contents were allowed to exotherm and then held for 15 minutes to form the seed polymer particles.

The temperature was then raised to 75° C. for the remainder of the polymerization. The remaining monomer mixture was added to the reactor over a period of 205 minutes, concurrently with the third stream feed. Additionally, 1.8 g sodium persulfate in 20 g water was added over 220 minutes. The final mixture was held at 75° C. for an additional 30 minutes after the initiator feed was completed.

The reactor was then cooled to 70-75° C. and solutions of 1.44 g t-butyl hydroperoxide in 20 g water and 1.0 g sodium metabisulfite in 20 g water were added via separate feed streams to the reactor over 60 minutes. The reactor is then cooled to <40° C. and the reactor contents were transferred. Example 1 has a total solids content of 56.6% based on the weight of the emulsion polymer, a pH of 4.5, and a viscosity of 400 cPs.

Example 2: Preparation of Emulsion Polymer Composition with 0.26 Weight Percent Hydrolyzable Silane Monomer and Narrow Particle Size Distribution Example 2 was prepared under the same procedure as that shown in Example 1, except that 2.6 g of the hydrolyzable silane monomer, vinyltrimethoxy silane in that example, was added to the monomer mixture. Example 2 had a total solids content of 56.6% based on the weight of the emulsion polymer, a pH of 4.6, and a viscosity of 300 cPs.

Example 3: Preparation of Emulsion Polymer Composition with 0.51 Weight Percent Hydrolyzable Silane Monomer and Narrow Particle Size Distribution Example 3 was prepared under the same procedure as that shown in Example 1, except that 5.1 g of the hydrolyzable silane monomer, vinyltrimethoxy silane in that example, was added to the monomer mixture. Example 3 had a total solids content of 56.7% based on the weight of the emulsion polymer, a pH of 4.5, and a viscosity of 560 cPs.

Comparative Example 1: Preparation of Emulsion Polymer Composition with 0 Weight Percent Hydrolyzable Silane Monomer and Narrow Particle Size Distribution Comparative example 1 was prepared under the same procedure as that shown in Example 1, except that the hydrolyzable silane monomer, vinyltrimethoxy silane in that example, was not included in the monomer composition. Comparative Example 1 had a total solids content of 56.7% based on the weight of the emulsion polymer, a pH of 4.5, and a viscosity of 480 cPs.

Example 4: Preparation of Polymer Composition Comprising Comparative Example 2 with Hydrolyzable Silane Added to Final Emulsion Polymer Example 4 was prepared by the slow addition under agitation of 10.0 g of glycidylpropyl trimethoxysilane (GP-TMS) to the Comparative example 1. The physical properties of this emulsion polymer composition was not affected by the addition of GP-TMS.

Comparative Example 2: Preparation of Emulsion Polymer Composition with Hydrolyzable Silane Monomer and Broad Particle Size Distribution (PDI>2.0)

In a three-liter jacketed glass reactor equipped with dual impellers, a reflux condenser, a stainless steel feed line, and a stainless steel thermocouple is added: 2.55 g sodium acetate, 9.2 g anionic surfactant, 65.6 g of a nonionic surfactant, 2.3 g of a 25% solution sodium vinyl sulfonate, and 1.66 g hydroxyethyl cellulose as colloidal stabilizer, and 575 g water. The reactor is then heated to 69° C.

A monomer mixture was prepared by combining 890.5 g vinyl acetate, 256.2 g butyl acrylate, and 1.09 g vinyl trimethoxysilane (VTMS).

An oxidizer solution was prepared by the addition of 0.81 g TBHP to 81.3 g water and a reducer solution was prepared by the addition of 0.81 g SMBS to 88 g water with 2.18 g anionic surfactant. A third stream solution of HEC was prepared by the addition of 1.25 g HEC to 41.4 g water.

To the reactor contents at 65° C. was fed the monomer mixture, the oxidizer solution, the reducer solution, and the HEC solution over 210 minutes, maintaining a temperature of 65-73° C. The final mixture was held at 75° C. for an additional 30 minutes after the initiator feed was completed.

With the reactor contents at 65-73° C., solutions of 1.33 g t-butyl hydroperoxide in 20 g water and 0.69 g sodium metabisulfite in 20 g water were added via separate feed streams to the reactor over 60 minutes. The reactor is then cooled to <40C and the reactor contents were transferred. Comparative Example 2 had a total solids content of 59.6% based on the weight of the emulsion polymer, a pH of 4.8, and a viscosity of 600 cPs.

Example 5: Preparation of Emulsion Polymer Composition with Hydrolyzable Silane Monomer and Broad Particle Size Distribution (PDI<2.0)

Example 5 was prepared under the same procedure as that shown in Example 1, except that the amount of HEC in the initial reactor charge was increased to 2.0 g. Example 5 had a total solids content of 56.7% based on the weight of the emulsion polymer, a pH of 4.5, and a viscosity of 210 cPs.

Example 6: Preparation of Emulsion Polymer Composition with Hydrolyzable Silane Monomer and Multimodal Particle Size Distribution (PDI<2.0 for Each Particle Size Population)

Example 6 was prepared under the same procedure as that shown in Example 1, except that the anionic surfactant was removed from the initial reactor charge. Comparative Example 1 had a total solids content of 56.0% based on the weight of the emulsion polymer, a pH of 4.4, and a viscosity of 60 cPs.

TABLE 1

Comparative Examples and Examples of the Current Invention

| Sample | VA | BA | VV | VTMS | GP-TMS | Dw | Dn | Dw/Dn |
|---|---|---|---|---|---|---|---|---|
| Example 1 | 69.76 | 28.14 | 2.00 | 0.10 | 0 | 0.245 | 0.232 | 1.061 |
| Example 2 | 69.65 | 28.09 | 1.99 | 0.27 | 0 | 0.243 | 0.218 | 1.115 |
| Example 3 | 69.47 | 28.02 | 1.99 | 0.52 | 0 | 0.236 | 0.158 | 1.494 |
| Comparative Example 1 | 69.83 | 28.17 | 2.00 | 0 | 0 | 0.250 | 0.219 | 1.142 |
| Example 4 | 69.76 | 28.14 | 2.00 | 0 | 1.0 | 0.250 | 0.219 | 1.142 |
| Comparative Example 2 | 77.6 | 22.3 | 0 | 0.1 | 0 | 0.218 | 0.095 | 2.295 |
| Example 5 | 69.76 | 28.14 | 2.00 | 0.10 | 0 | 0.358 | 0.213 | 1.681 |
| Example 6 | 69.76 | 28.14 | 2.00 | 0.10 | 0 | $Dw_1$: 0.346 $Dw_2$: 0.132 | $Dn_1$: 0.320 $Dn_2$: 0.114 | $Dw_1/Dn_1$: 1.081 $Dw_2/Dn_2$: 1.158 |

Preparation of Coating Compositions with Vinyl Acrylic Emulsion Polymer of the Example and Comparative Example Polymer Compositions Coating compositions incorporating the polymer emulsions shown in Examples 1-6 and Comparative Examples 1-2 were prepared according to the coating formulation shown in Table 2. The coating composition was prepared in accordance to procedures and practices known to those skilled in the art.

TABLE 2

Coating composition incorporating the emulsions shown in Table 1

| Ingredient (Source) | Purpose | kg |
|---|---|---|
| Water | Carrier | 68.04 |
| Natrasol ® Plus330 (Ashland) | Non-ionic surfactant | 0.45 |
| Drewplus ™ T4507 (Ashland) | Foam control agent | 0.91 |
| Mix for five minutes | | |
| AMP-95 ™ 95 (Angus) | Dispersant: 2-amino-2-methyl propanol | 1.13 |
| Coadis ™ 123K (Arkema) | Acrylic(hydrophobic) dispersant | 4.00 |
| Carbowet ® GA-100 (Evonik) | surfactant | 1.13 |
| Mix then add: | | |
| Dupont ™ Ti-Pure ® R-706 (DuPont) | Rutile $TiO_2$ | 105.68 |
| Minex ® 4 Nepheline Syenite (Sibelco) | Silica-deficient sodium potassium alumina silicate filler | 63.50 |
| Acticide ® MBS (Thor) | Fungicide (MIT/BIT) | 1.13 |
| Coapur ™ 2020 (Coatex) | Polyurethane thickener | 7.94 |
| Disperse to Hegman 5 | | |
| Letdown | | |
| Water | Carrier | 18.89 |
| Table 1 emulsion (55% solids by weight) | | 184.16 |
| Optifilm ™ Enhancer 400 (Eastman) | Coalescent | 6.12 |

Cleansability Evaluation of the Coating Compositions Containing the Vinyl Acrylic Emulsion Polymer of the Example and Comparative Example Polymer Compositions The coatings prepared according to Table 2 were tested for MPI cleansability using the procedure outlined in the "Cleansability" section. Graphite and coffee cleansability will not be discuss, as these specifications are easily obtained in vinyl acrylic emulsion polymer of the type described in the Examples and Comparative Examples in Table 1. The cleansability of the coatings to nigrosin were measured and these ΔE values are shown in Table 3, along with the ratio of weight average particle size to number average particle and the amount of hydrolyzable silane in each polymer emulsion composition.

TABLE 3

Comparative Examples and Examples of the Current Invention

| Sample | VTMS | GP-TMS | Dw | Dn | PDI (Dw/Dn) | Nigrosin cleansability (ΔE) |
|---|---|---|---|---|---|---|
| Example 1 | 0.10 | 0 | 0.245 | 0.232 | 1.061 | 0.55 |
| Example 2 | 0.27 | 0 | 0.243 | 0.218 | 1.115 | 0.47 |
| Example 3 | 0.52 | 0 | 0.236 | 0.158 | 1.494 | 0.37 |
| Comparative Example 1 | 0 | 0 | 0.250 | 0.219 | 1.142 | 2.10 |
| Example 4 | 0 | 1.0 | 0.250 | 0.219 | 1.142 | 1.51 |
| Comparative Example 2 | 0.1 | 0 | 0.218 | 0.095 | 2.295 | 3.89 |
| Example 5 | 0.10 | 0 | 0.358 | 0.213 | 1.681 | 0.6 |
| Example 6 | 0.10 | 0 | $Dw_1$: 0.346 $Dw_2$: 0.132 | $Dn_1$: 0.320 $Dn_2$: 0.114 | $Dw_1/Dn_1$: 1.081 $Dw_2/Dn_2$: 1.158 | 0.54 |

FIGS. 2-5 represent the particle size distributions analyzed for Examples 1-6 and Comparative Examples 1-2 as measured by disc centrifuge photosedimentometry, though other high resolution particle size techniques can be used to evaluate weight average particle size and number average particle size.

First, the emulsion polymer compositions of the current invention are represented by Examples 1-6 in Table 3. Disc centrifuge data for Examples 1-4 and Comparative Example 1 are shown in FIG. 2. In accordance with the first embodiment of this invention, Example 1 contains a low level of VTMS, with Examples 2 and 3 having increasing levels of VTMS. All three examples have a narrow PDI, represented by $D_w/D_n$. With the inclusion of 0.1 weight percent VTMS, nigrosin cleansability is ΔE 0.55, where increasing levels result in improved nigrosin cleansability; ΔE 0.47 with 0.26 weight percent VTMS and ΔE 0.37 with 0.51 weight percent VTMS. Comparative Example 1, on the other hand, demonstrates that without hydrolyzable silane in the emulsion polymer composition, even with a narrow PDI, the nigrosin cleansability is poor, with a ΔE of 2.1. In accordance with the second embodiment of the current invention, Example 4 contains no hydrolyzable silane introduced during the emulsion polymerization, though benefits from the addition of 1.0 weight percent of glycidylpropyl trimethoxysilane (GP-TMS). This further broadens the utility of this technology to a post-addition scenario, in which nigrosin cleansability is ΔE 2.10 without GP-TMS and ΔE 1.51 after the addition of GP-TMS.

Comparative Example 2 represents an emulsion polymer that is prepared in such a way at the generate a broad particle size distribution with PDI>2.0, as represented by the ratio of $D_w$ to $D_n$ in FIG. 3. While this emulsion polymer composition contains 0.1 weight percent VTMS, the broad particle size distribution results in poor nigrosin cleansability.

The emulsion polymer compositions of Examples 5 and 6, as shown in FIGS. 4 and 5, are broader than those in Examples 1-3, though the nigrosin cleansability is excellent. In Example 5, the amount of VTMS in the emulsion polymer composition is 0.1 weight percent and the PDI is <2.0. In Example 6 the amount of VTMS in the emulsion polymer composition is 0.1 weight percent and the PDI for each emulsion polymer particle population is <2.0, wherein the individual emulsion polymer particle populations are integrated separately, as shown in the scans in FIG. 5.

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An emulsion polymer composition comprising a population of sizes of polymeric particles, wherein the polymeric particles comprise a copolymer which comprises, in polymerized form:
    a) at least one vinyl acetate in an amount from 40 weight percent to 95 weight percent based on the overall weight of the polymeric particles;
    b) at least one ethylenically unsaturated monomer in an amount from 1.0 weight percent to 59.09 weight percent based on the overall weight of the polymeric particles; and
    c) at least one free radical polymerizable hydrolyzable silane monomer in an amount from 0.01 weight percent to 0.25 weight percent based on the overall weight of the polymeric particles,
    wherein the at least one ethylenically unsaturated monomer b) is not selected from a) or c),
    wherein the at least one free radical polymerizable hydrolyzable silane monomer is an ethylenically unsaturated silicon compound selected from the group consisting of vinyltrimethoxysilane, vinyltriethoxysilane, methacryloxypropyl trimethoxysilane, methacryloxypropyl triethoxysilane, and methacryloxypropyltripropoxysilane,
    wherein the population of sizes of polymeric particles comprises at least one mode,
    wherein each mode$_i$ comprises a respective weight average particle size $Dw_i$ as measured by disc centrifuge photosedimentometry and a respective number average particle size $Dn_i$ as measured by disc centrifuge photosedimentometry and wherein for each mode$_i$, $Dw_i/Dn_i$ is 2.0 or less, and
    wherein the viscosity of the emulsion polymer composition is from 60 cps to 560 cps.

2. The emulsion polymer composition according to claim 1, wherein the at least one ethylenically unsaturated monomer b) is selected from the group consisting of alkyl(meth)acrylate monomers, (meth)acrylamide monomers, and mixtures thereof.

3. The emulsion polymer composition according to claim 2, wherein the at least one ethylenically unsaturated monomer b) is selected from the group consisting of ethyl(meth)acrylate, butyl acrylate and mixtures thereof.

4. The emulsion polymer composition according to claim 1 wherein the copolymer further comprises, in polymerized form, at least one monomer selected from the group consisting of 2-acrylamido-2-methylpropane sulfonic acid (AMPS), sodium vinyl sulfonate (SVS), acrylic acid, methacrylic acid, and mixtures thereof in an amount from 0.01 weight percent to 2.5 weight percent, based on the overall dry weight of the polymeric particles.

5. The emulsion polymer composition according to claim 1, wherein the copolymer further comprises, in polymerized form, at least one monomer selected from the group consisting of vinyl versatate, vinyl esters of tertiary substituted α-carbon carboxylic acids, vinyl esters of C7-C20 carboxylic acids, and mixtures thereof, in an amount from 0.4 weight percent to 4 weight percent, based on the overall dry weight of the polymeric particles.

6. The emulsion polymer composition according to claim 1, further comprising from 0.01 weight percent to 1 weight percent based on the total dry weight of the polymeric particles, of hydroxyethyl cellulose in co-polymerized form.

7. A coating composition comprising an emulsion polymer composition according to claim 1 and at least one further component dispersed in an aqueous medium.

8. The coating composition according to claim 7, the at least one further component comprising at least one pigment.

9. The coating composition according to claim 7, further comprising at least one additive selected from the group consisting of dispersants, surfactants, defoamers, pH adjusters, extenders, opacifiers, rheology modifiers, coalescent agents, colorants, and mixtures thereof.

* * * * *